(12) United States Patent
Migliorini et al.

(10) Patent No.: US 6,623,866 B2
(45) Date of Patent: Sep. 23, 2003

(54) MULTILAYER FILMS INCLUDING ANTI-BLOCK

(75) Inventors: Robert A. Migliorini, North Haven, CT (US); Salvatore J. Pellingra, Wolcott, NY (US); Karen A. Sheppard, Victor, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 53 days.

(21) Appl. No.: 09/826,158

(22) Filed: Apr. 4, 2001

(65) Prior Publication Data

US 2002/0182390 A1 Dec. 5, 2002

(51) Int. Cl.⁷ ............................................... B32B 27/32
(52) U.S. Cl. ....................... 428/516; 428/213; 428/214; 428/215; 428/520
(58) Field of Search ................................ 428/520, 516, 428/515, 215, 214, 213

(56) References Cited

U.S. PATENT DOCUMENTS

| | | |
|---|---|---|
| 3,753,769 A | 8/1973 | Steiner |
| 4,058,645 A | 11/1977 | Steiner |
| 4,214,039 A | 7/1980 | Steiner et al. |
| 4,439,493 A | 3/1984 | Hein et al. |
| 4,447,494 A | 5/1984 | Wagner, Jr. et al. |
| 4,487,871 A | 12/1984 | Ishibashi et al. |
| 4,508,786 A | 4/1985 | Ishibashi et al. |
| 4,594,134 A | 6/1986 | Hanada et al. |
| 4,632,869 A | 12/1986 | Park et al. |
| 4,652,618 A | 3/1987 | Sumida et al. |
| 4,769,418 A | 9/1988 | Mizuno et al. |
| 4,865,908 A | 9/1989 | Liu et al. |
| 4,961,992 A | 10/1990 | Balloni et al. |
| 4,966,933 A | 10/1990 | Kawakami et al. |
| 5,019,447 A | 5/1991 | Keller |
| 5,049,436 A | 9/1991 | Morgan et al. |
| 5,057,177 A | 10/1991 | Balloni et al. |
| 5,176,954 A | 1/1993 | Kelier |
| 5,230,963 A | 7/1993 | Knoerzer |
| 5,364,704 A | 11/1994 | Murschall et al. |
| 5,366,796 A | 11/1994 | Murschall et al. |
| 5,397,635 A | 3/1995 | Wood, Jr. |
| 5,441,807 A | 8/1995 | Brandt et al. ................ 428/349 |
| 5,451,468 A | 9/1995 | Seiler et al. |
| 5,494,717 A | 2/1996 | Peiffer et al. |
| 5,585,418 A | 12/1996 | Nagata |
| 5,591,520 A | 1/1997 | Migliorini et al. |
| 5,667,902 A | 9/1997 | Brew et al. |
| 5,888,648 A | 3/1999 | Donovan et al. |
| 5,972,496 A * | 10/1999 | Bader et al. ................. 428/331 |
| 6,013,353 A * | 1/2000 | Touhsaent .................... 428/203 |
| 6,033,771 A * | 3/2000 | Heffelfinger ........... 264/173.14 |
| 6,048,608 A | 4/2000 | Peet et al. |
| 6,087,015 A | 7/2000 | Cretekos et al. |
| 6,113,996 A | 9/2000 | Amon et al. |
| 6,210,764 B1 * | 4/2001 | Hayes ......................... 428/144 |

FOREIGN PATENT DOCUMENTS

| | | |
|---|---|---|
| EP | 0826491 | 3/1998 |
| JP | 2060745 A | 3/1990 |
| WO | 01/26896 | 4/2001 |

* cited by examiner

*Primary Examiner*—D. Lawrence Tarazano
(74) *Attorney, Agent, or Firm*—Rick F. James; Keith A. Bell

(57) ABSTRACT

Multilayer films are contemplated. Specifically, films containing 3, 4, 5, 6 or more layers. Anti-block will be included in a tie layer, contiguous to a skin layer and a core layer. The film may contain one or two skin layers. If there are two tie layers, the anti-block may be found in one or both. Metallized films made from the multilayer films are also contemplated. Use of the multilayer films in packaging, imaging, or labeling, is further contemplated.

43 Claims, No Drawings

MULTILAYER FILMS INCLUDING ANTI-BLOCK

TECHNICAL FIELD

This invention relates generally to multilayer films containing materials that improve surface properties by inclusion of specific additives. More specifically this invention is directed to multilayer films with one or more non-additive containing skin layer or layers covering one or more layers containing anti-block additives.

BACKGROUND

Anti-blocks are often added to polymeric films to reduce or eliminate blocking or in some instances to reduce the coefficient of friction (COF) in a film. In multilayer films, both organic and inorganic anti-blocks are often located in an outer most layer or layers outside of the multilayer film. Such a location can lead to bleed-out or plate-out during film manufacture, converting of the film to its use, and in its use, such as in a package. The anti-block can also fallout or be broken out of the surface, leading to an undesirable heightening of the COF.

Plate-out on equipment can mean expensive downtime for equipment.

Such anti-blocks can also damage a coated or metallized film surface.

All these tendencies act to keep anti-blocks at a lower level of inclusion and therefore efficacy, than might otherwise be desirable.

U.S. Pat. No. 6,087,015 suggests a matte surface film comprising a) a core layer of thermoplastic polymer, b) matte surface layer which includes a blend of film forming polymers and a polydialkylsiloxane. The film is purported to produce a film having a matte surface layer which has a low coefficient of friction. There is no disclosure to a skin layer over the layer containing the polydialkylsiloxane.

Japanese Patent Application Publication No. 2668799 suggests a biaxially drawn multiple layer film characterized in that a surface layer of a composition comprised of components A and B are laminated on at least one surface of a biaxially drawn crystalline propylene polymer base layer. Component A is 100 parts by weight of at least one resin selected from a propylene-ethylene random copolymer of an ethylene content of 3 to 8 weight percent and a propylene-ethylene-butene-1 random copolymer of an ethylene content of 0.5 to 5 weight percent and a butene-1 content of 3 to 25 weight percent. Component B is 0.1 to 1.0 parts by weight of polydiorganosiloxane of a degree of polymerization n of 3500 to 8000. The film purportedly has markedly improved adaptability to packaging machines and suitability for high speed automatic packaging equipment.

There is a commercial need therefore, for a multilayer film which will reduce or eliminate the issues discussed above relating to an anti-block in an outermost layer or surface of a multilayer film.

SUMMARY

We have discovered that a skin layer or layers coextruded over a layer containing organic or inorganic anti-block, can provide a multilayer film having a low COF and a substantial absence of bleed-out, plate-out, scratching another film surface and the like.

A film, comprising a core layer having a first surface and a second surface, the core layer being selected from one of, high density polyethylene (HDPE), linear low density polyethylene (LLDPE), ethylene propylene random copolymer (RCP), isotactic polypropylene homopolymer (iPP), syndiotactic polypropylene (sPP) or combinations thereof, is contemplated. The core layer may be present in the total film at a thickness in the range of from 5–500 μm. Additionally, at least a first tie layer, contiguous to the first surface of the core layer, the first tie layer being one of iPP, RCP, propylene butene copolymer (PB), ethylene propylene butene terpolymer (EPB), HDPE, LLDPE, medium density polyethylene (MDPE), maleic anhydride grafted polypropylene, maleic anhydride grated polyethylene, sPP, or combinations thereof, where the first tie layer further includes in the range of from 0.05–2 weight % of an additive selected from one of amorphous silica, calcium carbonate, magnesium silicate, aluminum silicate, calcium phosphate, crosslinked polymethacrylate, polymethyl silsesquioxane, polycarbonate, polyamide, polyester, polytetrafluoroethylene (PTFE) powder or combinations thereof, the weight % based on the total weight of the first tie layer, wherein the first tie layer has a thickness in the film in the range of from 0.5–10 μm, wherein the additive has a mean particle size in the range of from 0.5–20 μm, and a mean particle size of >10% of the thickness of the first tie layer; and at least a first skin layer contiguous to the first tie layer, such that the first tie layer is spaced between the core and the first skin layer, the first skin layer being a material selected from one of iPP, RCP, PB, EPB, HDPE, LLDPE, MDPE, ethylene vinyl alcohol (EVOH), EVA copolymer, low density polyethylene (LDPE), ethylene propylene block copolymer or combinations thereof. The skin layer may be substantially free of the additive, wherein the first skin layer has a thickness in the range of from 0.1–8 μm; and the film has a COF, as determined by ASTM D 1894, <2.

These and other features, aspects and advantages of embodiments of our invention, will become better understood with reference to the following description and appended claims.

DESCRIPTION

In certain embodiments of our invention, multilayer films with anti-block in a layer below a skin layer are contemplated. Stated another way, anti-block agents or additives are included in multilayer films, in at least one tie layer between a core layer and a skin layer or layers. The anti-block may be generally inorganic or organic in nature.

Following is a detailed description of certain combinations of thermoplastics and anti-blocks, their fabrication into useful articles such as multilayer films, and use of these articles. Those skilled in the art will appreciate that numerous modifications to these embodiments may be made without departing from the scope of our invention. For example, while certain specific film layer compositions are exemplified and additives within those layers, along with certain arrangement of layers within the film, other compositions and arrangements are also contemplated. Additionally, while packaging, labeling and imaging are discussed as among the uses for embodiments of our inventive films, other uses are also contemplated.

To the extent that this description is specific, it is solely for the purpose of illustrating certain embodiments of the invention and should not be taken as limiting the present inventive concepts to these specific embodiments.

Core Layer

The core layer of embodiments of our invention may include a material selected from one of isotactic homopolymer polypropylene (iPP), high density polyethylene (HDPE), linear low density polyethylene (LLDPE), syndiotactic polypropylene (sPP), or combinations thereof. Any of these materials, as well as the polyolefins of other layers, may be Ziegler-Natta catalyzed or metallocene catalyzed, or combinations thereof. The core layer will generally have two surfaces, a first and a second surface.

Polypropylene copolymers, if used in the core layer, may include one or more comonomers selected from one or more of ethylene or butene. The propylene will be present in such co or terpolymers at >90 weight percent. Propylene polymers contemplated will generally have a melting point $\geq 140°$ C., or $\geq 150°$ C. Examples of propylene polymers include FINA 3371 (commercially available from Fina Oil and Chemical Company), and P 4252 (commercially available from ExxonMobil Corp.). Syndiotactic polypropylene may possess an isotacticity of less than 25%, or less than 15%, or less than 6%. The mean length of the syndiotactic sequences is greater than 20, or greater than 25. Syndiotactic polypropylene resins suited to use in embodiments of our invention include EOD 93-06 and EOD 95-01, available from Fina Oil and Chemical Company.

Melt flow ratios (MFRs) of the polypropylene polymers may range from 0.5 to 8 or 1.5 to 5 dg/min. Melt indices of the ethylene based polymers may range from 0.5 to 15 g/10 min.

Useful ethylene polymers include, but are not limited to HDPE M-6211 and HDPE M-6030 from Equistar Chemical Company; and HD-6704.67 from ExxonMobil Chemical Co.

The core layer of embodiments of our invention will have a thickness in the range of from 5–50 μm or 5–200 μm or 5–500 μm.

The core layer may contain microscopic voids and/or 1–15, or 1–8, or 2–4 weight % of an opacifying agent, selected from one of iron oxide, carbon black, aluminum, TiO2, talc, or combinations thereof.

Void-initiating particles, which may be added as filler to the polymer matrix material of the core layer, can be any suitable organic or inorganic material which is incompatible with the core material at the temperature of biaxial orientation, such as polybutene teraphthalate (PBT), nylon, solid or hollow preformed glass spheres, metal beads or spheres, ceramic spheres, calcium carbonate, or combinations thereof.

The average diameter of the void-initiating particles may be from 0.1 to 10 μm. These particles may be of any desired shape or they may be substantially spherical in shape. This does not mean that every void is the same size. It means generally each void tends to be of like shape when like particles are used even though they vary in dimensions. These voids may assume a shape defined by two opposed and edge contacting concave disks. These void initiating particles will be present in the core layer at <30, or <20, or <10 or in the range of from 2–10 weight percent, based on the total weight of the core layer.

The two average major void dimensions are greater than 30 microns.

The void-initiating particle material, as indicated above, may be incompatible with the core material, at least at the temperature of biaxial orientation.

The core has been described above as being a thermoplastic polymer matrix material within which is located a strata of voids. The voids create the matrix configuration. The term "strata" is intended to convey that there are many voids creating the matrix and the voids themselves may be oriented so that the two major dimensions are aligned in correspondence with the direction of orientation of the polymeric film structure. As described herein above, iron oxide in an amount of from 1–8% by wt. or 2%–4% and aluminum in an amount of from 0–1.0% by wt. or 0.25%–0.85% are added to the core matrix. Carbon black may also be used in lieu of some or all of the iron oxide.

A typical void of the core is defined as having major dimensions X and Y and minor dimensions Z, where dimension X is aligned with machine direction orientation, dimension Y is aligned with transverse direction orientation and dimension Z approximately corresponds to the cross-sectional dimension of the spherical particle which initiated the void.

Orientation conditions may be such that the X and Y dimensions of the voids of the core by major dimensions in comparison to the Z dimension. Thus, while the Z dimension generally approximates the cross-sectional dimension of the spherical particle initiating the void, X and Y dimensions may be significantly greater.

Polypropylene may be oriented at a temperature higher than its glass transition temperature. The temperature conditions may permit X and Y to be at least several multiples of the Z dimension, without void splitting. As indicated above, the matrix polymer and the void initiating particle may be incompatible and this term is used in the sense that the materials are two distinct phases. The spherical void initiating particles constitute a dispersed phase throughout the lower melting polymer which polymer will, ultimately, upon orientation, become a void-filled matrix with the spherical particles positioned somewhere in the voids.

The core layer may contain hydrocarbon wax. The wax used is typically a hydrocarbon wax, which may be either a mineral wax or a synthetic wax. Polyethylene type wax may have an average chain length between 22 and 65 carbon atoms, or between 22 and 40 carbon atoms, a molecular weight between 300 and 800, and a melting point between about 125° F. and 190° F. (52° C. and 88° C.). These waxes include paraffin waxes, microcrystalline waxes, and intermediate waxes length, a molecular weight between about 300 and 450, and a melting point between about 125° F. and 160° F. (52° C. and 71° C.). The paraffin wax typically include a mixture of normal and branched paraffins, with the normal paraffin content generally being from 35 to 90 percent by weight. The paraffin wax typically has a broad molecular weight distribution. For example, each fraction of chains containing a certain number of carbon atoms represents less than 25 percent or less than 20 percent, of the wax. A paraffin wax having a broad molecular weight distribution provides better barrier properties than a paraffin wax having a narrow molecular weight distribution. A suitable wax is CHEVRON 143. It has a melting point of 143° F. (62° C.), an average chain length of 29 carbon atoms, an average molecular weight of 416, a normal paraffin content of 74 percent, and contains 12 percent C 28 fraction, 12 percent C 29 fraction, and 11 percent C 30 fraction (the three largest fractions in the wax). Typically, the core layer contains >2.5 wt % wax, >5 wt % wax, >7.5 wt % wax, >10 wt % wax, or >12 wt % wax or >15 wt % wax, based on the total weight of the core layer.

The core layer may also contain a hydrocarbon resin. Examples of such hydrocarbon resins may be found in U.S. Pat. No. 5,667,902, incorporated herein by reference. The resin may be a low molecular weight hydrocarbon which is compatible with the core polymer. The resin may, optionally, be hydrogenated. The resin may have a number average molecular weight <5000, or <2000, or in the range of from 500–1000. The resin can be natural or synthetic and may have a softening point in the range of from 60°–180° C. examples of hydrocarbon resins include, but are not limited to petroleum resins, terpene resins, styrene resins and cyclopentadiene resins.

Examples of commercially available hydrogenated resins are those including PICCOLYTE, REGALREZ, REGALITE, available from Hercules Corp., and ESCOREZ, available from ExxonMobil Chemical Co.

One particular resin may be referred to as a saturated alicyclic resin. Such resins, if used, may have a softening point in the range of from 85°–140° C., or 100°–140° C., as measured by the ring and ball technique. Examples of commercially available saturated alicyclic resins are ARKON-P, available from Arakawa Forest Chemical Industries, Ltd., of Japan.

The core layer may contain <15%, or <10% by weight of any such resins described above, singly or in any combination or in the range of from 2–10% by weight, or in some cases a different level 1–5% by weight, or 6–12% by weight.

Additionally, the core layer may contain more than one of the ingredients discussed above.

Tie Layer

A first and an optionally second tie layer, contiguous respectively to the first and second surfaces of the core layer, are also contemplated. The first and/or optional second tie layers may further include an anti-block additive more fully discussed below. If there are two or more tie layers, the anti-block additive may be in one or more of these tie layers. The tie layer or layers of embodiments of our invention will generally be contiguous to one or both surfaces of the core layer. The tie layers, if two are present, may be the same or different in their polymer makeup. Materials useful in the tie layer include, but are not limited to ethylene propylene block copolymers, ethylene propylene random copolymers (RCP), isotactic polypropylene homopolymers (iPP), high density polyethylene (HDPE), medium density polyethylene (MDPE), linear low density polyethylene (LLDPE), maleic anhydride grafted polypropylene, maleic anhydride grafted polyethylene, ethylene propylene butene terpolymers (EPB), propylene butene copolymer (PB), syndiotactic polypropylene (sPP) or combinations thereof. The first and optional second tie layers may be the same polymer composition, or different. The first and optional second tie layers may be present in the film in the range of from 0.5–10 $\mu$m, or 0.5–7 $\mu$m, or 0.5–8 $\mu$m or 0.7–5 $\mu$m, 0.7–4 $\mu$m, or 0.7–3 $\mu$m or 0.7–2 $\mu$m, each, the first and second tie layers may be the same or different thickness.

Anti-Block

Typical inorganic anti-blocks that may be used in multilayer films of embodiments of our invention include, but are not limited to, amorphous silica, calcium carbonate, magnesium silicate, aluminum silicate, calcium phosphate, or combinations thereof. Typical organic anti-blocks that may be used in multilayer films of embodiments of our invention include, but are not limited to, crosslinked polymethacrylate (EPOSTAR MA, available from Nippon Shokubai), polymethylsilsesquioxane (TOSPEARL, available from Toshiba Silicon Co.), benzoguanamine formaldehyde, polycarbonate, polyamide, polyester, polytetrafluoroethylene (TEFLON) powder, or combinations thereof. Also contemplated are combinations of organic and inorganic anti-blocks. Typical loadings of such anti-block or combinations of anti-block, in each layer, may be in the range of from 0.05–2 weight percent, or 0.075–1.5 weight percent, or 0.1–1 weight percent, or 0.1–0.5 weight percent, based on the total weight of the layer containing the anti-block. The anti-block (mean) particle sizes contemplated in embodiments of our invention are in the range of from 0.1–20 $\mu$m, or 0.5–20 $\mu$m, or 0.5–15 $\mu$m, or 1–10 $\mu$m.

The position or location of the anti-block in the multilayer film structure will be in the tie layer or layers, not in one or more skin or outer layers. Such multilayer films having anti-block, as herein described, in a surface layer or layers, are generally outside the scope of embodiments of our invention. If there are two tie layers, the anti-block additives may be in one or both of the tie layers.

In embodiments of our invention, the anti-block particle size may be larger in mean particle size than the thickness of the tie layer or layers of which it is a part. The mean particle size may be >10% or >20% or >30% or >40% or >60% or >80% or >100% or >120% or >140% or >160% or >180% than the thickness of the tie layer or layers.

Skin Layer

Other embodiments of our invention contemplate a skin layer or layers contiguous to the first tie layer and optionally contiguous to a second tie layer, or contiguous to the core layer, if the second tie layer is not present. In these cases, a first skin layer may be contiguous to a first tie layer, and a second skin layer may be contiguous to a second tie layer or to the core layer. The skin layer or layers may be a material selected from one or more of the following: isotactic polypropylene homopolymer (iPP), ethylene propylene block copolymer, ethylene propylene random copolymer (RCP), propylene butene copolymer (PB), ethylene propylene butene terpolymer (EPB), high density polyethylene (HDPE), linear low density polyethylene (LLDPE), medium density polyethylene (MDPE), ethylene vinyl alcohol (EVOH), low density polyethylene (LDPE), ethylene vinyl acetate (EVA) or combinations thereof. If there are two skin layers, they may be the same or different compositionally, and/or be of the same thickness or different. One or both, if two skin layers are present, will be substantially free of added anti-block additive discussed supra. By substantially free, we intend that less than 0.05% by weight or less than 0.025% by weight or less than 0.01% by weight or less than 0.001% by weight or 0% by weight of any of the above additives be present in the skin layer or layers based on the total weight of the layer containing the additive. The skin layer may be present in the film at 0.1–5 $\mu$m, or 0.1–8 $\mu$m, or 0.1–3 $\mu$m, or 0.1–1.5 $\mu$m, or $\leq$3 $\mu$m or $\leq$2 $\mu$m or $\leq$1.5 $\mu$m or $\leq$1 $\mu$m. A second skin layer, if present will be present in the range of from 0.1–5 $\mu$m, or 0.1–3 $\mu$m, or 0.3–1.5 $\mu$m, or 0.3–1 $\mu$m.

Coating

In another embodiment, one or more coatings may be applied to one or more skin layers may include techniques such as coating with acrylic polymers, polyvinylidene chloride (PVDC), ethylene acrylic acid copolymers (EAA), ethylene methyl acrylate copolymers (EMA), or poly(vinyl) alcohol (PVOH).

Acrylic coatings can be derived from any of the terpolymeric compositions disclosed in U.S. Pat. Nos. 3,753,769, and 4,865,908, the contents of which are incorporated by reference herein. These coating compositions contain as a film forming component, a resin including an interpolymer of (a) from 2 to 15 or from 2.5 to 6 parts by weight of an alpha-beta monoethylenically unsaturated carboxylic acid selected including one or more of acrylic acid, methacrylic acid, or mixtures thereof, and (b) from 85 to 98 or from 94 to 97.5 parts by weight of neutral monomer esters, the neutral monomer esters including (1) methyl acrylate or ethyl acrylate and (2) methyl methacrylate. These interpolymer compositions are further characterized by including from 30 percent to 55 percent by weight of methyl methacrylate when the alkyl acrylate is methyl acrylate and from 52.5 percent to 69 percent by weight of methylmethacrylate when the alkyl acrylate is ethyl acrylate. As more fully described infra, such coating compositions can be applied to the films herein in a variety of ways including in the form of ammoniacal solutions.

Similarly useful are copolymeric coating compositions prepared from the foregoing neutral monomer esters. These coating compositions are advantageously applied to the film laminates in the form of emulsions.

The coating can also be based on any of the known and conventional polyvinylidene chloride (PVDC) compositions heretofore employed as coatings in film manufacturing operations, e.g., any of the PVDC materials described in U.S. Pat. Nos. 4,214,039; 4,447,494; 4,961,992; 5,019,447; and 5,057,177.

U.S. Pat. No. 5,230,963 discloses enhancing oxygen barrier of films by a method involving a coating, both of which are incorporated herein by reference, or with prior application of a primer layer to enhance adhesion of the PVDC coating layer to the film surface to which it is applied. Commercially available PVDC latexes having a vinylidene chloride content of at least 50% or from 75% to 92% may be employed. The PVDC can also be provided as a copolymer of vinylidenechloride and one or more other ethylenically unsaturated comonomers including alpha, beta ethylenically unsaturated acids such as acrylic and methacrylic acids; alkyl esters containing 1–18 carbon atoms of the acids, such as methylmethacrylate, ethyl acrylate, butyl acrylate, etc. In addition alpha, beta ethylenically unsaturated nitrites such as acrylonitrile and methacrylonitrile and monovinyl aromatic compounds such as styrene and vinyl chloride comonomers can be employed. Specific PVDC latexes contemplated include: 82% by weight vinylidene chloride, 14% by weight ethyl acrylate and 4% by weight acrylic acid. Alternatively a polymer latex including 80% by weight vinylidene chloride, 17% methyl acrylate and 3% by weight methacrylic acid can likewise be employed.

The vinyl alcohol polymers, which may be used as coatings, can be any commercially available material. For example, VINOL 125, 99.3+% super hydrolyzed polyvinyl alcohol, or VINOL 325, 98% hydrolyzed polyvinyl alcohol obtained from Air Products, Inc. Application of a PVOH coating is further described in U.S. Pat. No. 5,230,963, incorporated herein by reference.

Before applying the coating composition to the appropriate substrate, the upper surface of the film may be treated as noted herein to increase its surface energy. This treatment can be accomplished employing known techniques, such as, for example, film chlorination, i.e., exposure of the film surface to gaseous chlorine, treatment with oxidizing agents such as chromic acid, hot air or steam treatment, flame treatment and the like. Although any of these techniques is effectively employed to pretreat the film surface, another method of treatment is an electronic treatment method which includes exposing the film surface to a high voltage corona discharge while passing the film between a pair of spaced electrodes. After electronic treatment of the film surface, the coating composition is then applied thereto.

An intermediate primer coating can be. In this case, the film may be first treated by one of the foregoing methods to provide increased active adhesive sites thereon and to the thus treated film surface there may be subsequently applied a continuous coating of a primer material. Such primer materials are well known in the art and include, for example, epoxy and poly(ethylene imine) (PEI) materials. U.S. Pat. No. 3,753,769 to Steiner, U.S. Pat. No. 4,058,645 to Steiner and U.S. Pat. No. 4,439,493 to Hein et al., incorporated herein by reference, disclose the use and application of such primers. The primer provides an overall adhesively active surface for thorough and secure bonding with the subsequently applied coating composition and can be applied to the film by conventional solution coating means, for example, by mating roller application.

The coating composition can be applied to the film as a solution, one prepared with an organic solvent such as an alcohol, ketone, ester, and the like. However, since the coating composition can contain insoluble, finely divided inorganic materials which may be difficult to keep well dispersed in organic solvents, it is preferable that the coating composition be applied to the treated surface in any convenient manner, such as by gravure coating, roll coating, dipping, spraying, and the like. The excess aqueous solution can be removed by squeeze rolls, doctor knives, and the like.

The film can be stretched in the machine direction, coated with the coating composition and then stretched perpendicularly in the transverse direction. In yet another embodiment, the coating can be carried out after biaxial orientation is completed.

The coating composition may be applied in such amount that there will be deposited upon drying a smooth, evenly distributed layer, generally on the order of from 0.01–0.2 mil (0.25–5 $\mu$m) thickness (equivalent to 0.2–3.5 g per 1000 sq. in. of film). Generally, the coating will be present from 1 to 25 wt % or 7 to 15 wt % of the entire coated film composition, based on the total weight of the multilayer film. The coating on the film may subsequently be dried by hot air, radiant heat or by any other convenient means.

Orientation

Embodiments of our invention include possible orientation of the multilayer films. Orientation in the direction of extrusion is known as machine direction orientation (MD), orientation perpendicular to direction of extrusion is known as transverse direction (TD). Orientation may be accomplished by stretching or pulling a blown film in the MD, using the blow-up ratio to accomplish TD orientation, or both may be used. Blown films or cast films may also be oriented by a tenter frame orientation subsequent to the film formation process, again in one or both directions. Orientation ratios may generally be in the range of 1:1–1:15 or MD 1:4–1:10 or in TD 1:7–1:12.

Treating

One or more of the exposed or outer most surfaces of the multi-layer films of embodiments of our invention can be surface-treated to render them receptive to metallization, coating, printing inks or lamination. The surface treatment can be carried out according to one of the methods known in the art. Methods which include, corona treatment, flame treatment, plasma, or treatment by means of a polarized flame. Generally the treated surface of films of embodiments of our invention will be treated on the outermost surface of the composite film that is opposite the layer containing the antiblock additives. If there are two tie layers containing antiblock, one surface will generally be treated.

Surface Property Measurement

Coefficient of Friction (COF) is a measure of surface properties. Such measure is made by ASTM D 1894. COF is conventionally measured in this test at room temperature (22° C.) and for embodiments of our invention, room temperature COF will be <2 or <1.5 or <1.25 or <1.0 or <0.9 or <0.8, or <0.7. Another measure of COF is hot slip, measured at 135° C. (275° F.). For embodiments of our invention will be <2 or <1.9 or <1.85 or <1.8. Both COF tests will generally be done on an untreated surface to itself.

If there are two untreated surfaces, one will be selected, and tested to itself.

Metallization

Generally one of the skin layers will be a layer that may be metallized. However, if no skin layer is utilized, a core layer surface may be metallized. Such metallization may include vacuum metallization through deposition of aluminum.

Other Ingredients

Other ingredients in embodiments of our inventive blends include, but are not limited to, pigments, colorants, antioxidants, antiozonants, antifogs, antistats, fillers such as calcium carbonate, diatomaceous earth, carbon black, combinations thereof, and the like. Such additives may be used in effective amounts, which vary depending upon the property required, and are, typically selected from one or more of anti-block, slip additive, antioxidant additive, moisture barrier additive or gas barrier additive.

Useful antistatic additives which can be used in amounts ranging from 0.05 to about 3 weight %, based upon the weight of the layer, include alkali metal sulfonates, polyether-modified polydiorganosiloxanes, polyalkylphenylsiloxanes and tertiary amines.

Typical slip additives include higher aliphatic acid amides, higher aliphatic acid esters, waxes and metal soaps which can be used in amounts ranging from 0.1–2 weight percent based on the total weight of the layer. An example of a useful fatty amide slip additive is erucamide.

A conventional silicone oil or gum additive having a viscosity of 10,000–2,000,000 cSt. is also contemplated.

Useful antioxidants are, generally used in amounts ranging from 0.1 weight %–2 weight percent, based on the total weight of the layer, phenolic antioxidants. One useful antioxidant is commercially available under the trademark "IRGANOX 1010" (Ciba-Geigy).

Barrier additives are used in useful amounts and may include low-molecular weight resins, hydrocarbon resins, particularly petroleum resins, styrene resins, cyclopentadiene resins and terpene resins.

Optionally, the skin layers may be compounded with a wax for lubricity. Amounts of wax range from 2–15 weight % based on the total weight of the layer. Any conventional wax useful in thermoplastic films is contemplated.

Definitions and Testing Protocols

| | |
|---|---|
| Melt Flow Rate (MFR): | ASTM D 1238, condition L |
| Melt Index (MI): | ASTM D 1238, condition E |
| COF | ASTM D 1894 (room temperature, 22° C.) |
| Hot Slip (, and 135° C.) | proprietary test outlined herein. |

Experimental

Materials:

Coextruded Heat Sealable Type Film Structures

The film structure design is evaluated on a semiworks line first in a 5 layer film, including an isotactic homopolymer polypropylene core layer, with isotactic homopolymer polypropylene tie layers on both sides of the core layer, and EPB terpolymer outer skin layers. The tie layers each contain organic anti-block at concentrations of 0.5–1.0 weight % (based on the weight of each layer) in homopolymer polypropylene. The tie layers are approximately 1.5 micron thick, with thin 0.63 micron thick skin layers. One side of the film structure is flame treated. The actual film design and resins utilized are shown in the table below:

TABLE 1

| Flame Treated |
|---|
| EPB terpolymer (CHISSO 7400) |
| (0.63 microns thick) |
| PP homopolymer (FINA 3371) + 0.5 to 1.0% of organic anti-block |
| (1.5 micron thickness) |
| Isotactic PP homopolymer (FINA 3371) |
| (13.25 micron thickness) |
| PP homopolymer (FINA 3371) + 0.5 to 1.0% or organic anti-block |
| (1.5 micron thickness) |
| EPB terpolymer (CHISSO 7400) |
| (0.63 microns thick) |
| Untreated |

Table 2 below summarizes the results obtained when using both EPOSTAR MA and TOSPEARL anti-block in the tie layers with a sub-micron outer skin layer. The EPOSTAR is evaluated at two particle sizes, 6 and 10 micron, and the TOSPEARL is tested only at the 4.5 micron size. Two loading levels of each particle size are investigated (0.5 and 1.0%). With these relatively large organic anti-block particles and thin outer skin layers, the improvement in COF on the outer surface are noted. The improvement in hot slip is also evident when incorporating the anti-block particles in the tie layer with no additives in the outer or skin terpolymer layer.

TABLE 2

| Anti-block added to PP tie Layer | Particle size (microns) | Conc. (%) | COF | Hot Slip |
|---|---|---|---|---|
| None | — | — | 2.51 | 2.19 |
| EPOSTAR MA 1006 | 6 | 0.5 | 0.63 | 1.55 |
| | 6 | 1.0 | 0.54 | 1.78 |
| EPOSTAR MA 1010 | 10 | 0.5 | 0.62 | 1.43 |
| | 10 | 1.0 | 0.53 | 1.45 |
| TOSPEARL T145 | 4.5 | 0.5 | 0.58 | 1.71 |
| | 4.5 | 1.0 | 0.59 | 2.37 |

The 2.37 data point for hot slip (COF) in the above table appears to be a bad data point and not descriptive of embodiments of our invention.

This application includes references to certain trademarks. Although the use of trademarks is permissible in patent applications, the proprietary nature of the marks should be respected and every effort made to prevent their use in any manner which might adversely affect their validity as trademarks.

Although the present invention has been described in considerable detail with reference to certain embodiments thereof, other embodiments are possible. For example, while multilayer films with anti-block in one or more tie layers are exemplified, other are contemplated. Therefore, the spirit and scope of the appended claims should not be limited to the description of the embodiments contained herein.

We claim:

1. A film, comprising:
    a) a core layer having a first surface and a second surface, said core layer being an isotactic polypropylene homopolymer (iPP), said core layer being present in the total film at a thickness in the range of from 5–50 μm;
    b) a first tie layer, contiguous to said first surface of said core layer, said first tie layer being one of isotactic polypropylene (iPP), propylene butene copolymer (PB), ethylene propylene random copolymer (RCP), or ethylene propylene butene terpolymer (EPB), said first tie layer further including in the range of from 0.1–0.5 weight % of an additive selected from one of, crosslinked polymethacrylate, polymethyl silsesquioxane, amorphous silica or combinations thereof, wherein said first tie layer is present in said film in the range of from 0.7–4 μm, wherein said additive has a mean particle size in the range of from 1–10 μm, wherein said additive in said tie layer has a mean particle size >160% of the thickness of said tie layer;

c) a first skin layer contiguous to said first tie layer, said first skin layer being a material selected from one of iPP, ethylene propylene random copolymer (RCP), propylene butene copolymer (PB), ethylene propylene butene terpolymer (EPB), high density polyethylene (HDPE), linear low density polyethylene (LLDPE), medium density polyethylene (MDPE), ethylene propylene block copolymer, ethylene vinyl acetate copolymer (EVA), ethylene vinyl alcohol copolymer (EVOH), or combinations thereof, said skin layer being substantially free of said additive of b), wherein said first skin layer has a thickness in the range of from 0.3–1.5 μm; and d) a second skin layer contiguous to said second surface of said core layer, said second skin layer being a material selected from one of RCP, PB, EPB, HDPE, LLDPE, MDPE, iPP, EVA, EVOH, or combinations thereof, wherein said second skin layer has a thickness in the range of from 0.5–3 μm, wherein said first and said second skin layers may be the same material or different, wherein said first and said second skin layers may be the same or different thickness;

wherein said film has a COF, measured by ASTM D 1894, <1 and a hot slip, measured at 135° C., <1.8, said COF and said hot slip measured on said first skin layer to itself.

2. The film of claim 1, wherein said core layer further includes one of:

i) an opacifying agent selected from one of iron oxide, carbon black, aluminum, $TiO_2$, talc, or combinations thereof; said opacifying agent present in said core layer in the range of from 2–4 weight percent, based on the total weight of the core layer;

ii) a material selected from one of polybutene teraphthalate, $CaCO_3$ or combinations thereof, present in the range of from 2–10 weight %, based upon the total weight of said core layer, said material having a mean particle size in the range of from 0.1–10 μm;

iii) a hydrocarbon resin, said resin being one of petroleum resin, terpene resin, styrene resin, cyclopentadiene resin, saturated alicyclic resin, or combinations thereof, said resin has a number average molecular weight <5000, said resin has a softening point in the range of from 60°–180° C., and said resin present in said core layer at <10 weight percent;

v) or combinations thereof.

3. The film of claim 2, wherein said film is oriented.

4. The film of claim 3, wherein said film is biaxially oriented.

5. The film of claim 4, wherein at least one outermost surface of said film is treated with a treatment selected from one of corona, flame, polarized flame or plasma.

6. The film of claim 5, wherein said film is coated on at least one outermost surface of said film, said coating selected from one of polyvinylidene chloride (PVDC), polyvinyl alcohol (PVOH), or combinations thereof, wherein said coating is present on said one or more outermost surface in the range of 0.2–5 μm, wherein said outermost surface is the outermost surface of said second skin layer.

7. The film of claim 5, wherein said first outermost surface or said second outermost surface of said film is metallized.

8. The film of claim 7, wherein said metallization is the vacuum deposition of aluminum.

9. The film of claim 5 wherein said film is coated on one outermost surface of said film, said coating selected from one of polyvinylidene chloride (PVDC), polyvinyl alcohol (PVOH), or combinations thereof, wherein said coating is present on said one or more outermost surface in the range of 0.2–5 μm, and wherein said one outermost surface of said film is metallized by vacuum deposition of aluminum, wherein said outermost surface is the outermost surface of said second skin layer.

10. A film comprising:

a) an isotactic homopolymer polypropylene core layer, said core layer having a thickness in the range of from 5–50 μm, said core layer having a first and a second surface;

b) a first tie layer spaced between said first surface of said core layer and a first skin layer, said first tie layer being one of isotactic homopolymer polypropylene, maleic anhydride grafted polypropylene, or combinations thereof, said first tie layer having a thickness in the range of from 0.5–7 μm;

c) said first skin layer being one of, HDPE, or EVOH having a thickness ≦1 μm;

d) a second tie layer, contiguous to said second surface of said core layer and spaced between said core layer and a second skin layer, said second tie layer being one of iPP, RCP, PB, EPB, maleic anhydride grafted polypropylene, or combinations thereof, said tie layer further including in the range of from 0.05–2 weight % of an additive selected from one of amorphous silica, crosslinked polymethacrylate, polymethyl silsesquioxane, or combinations thereof, said weight % based on the total weight of the tie layer, wherein said tie layer has a thickness in the range of from 0.5–7 μm, wherein said additive has a mean particle size in the range of from 1–20 μm, wherein said additive in said tie layer has a mean particle size >180% of the thickness of said tie layer; and e) said second skin layer being one of EPB, RCP or PB, said second skin layer having a thickness ≦2 μm wherein said film has a COF, as determined by ASTM D 1894, <2, measured on an outermost surface of second skin layer to itself.

11. The film of claim 10, wherein said core layer further includes one of:

i) an opacifying agent selected from one of iron oxide, carbon black, aluminum, $TiO_2$, talc, or combinations thereof; said opacifying agent present in said core layer in the range of from 2–4 weight percent, based on the total weight of the core layer;

ii) a material selected from one of polybutene teraphthalate, nylon, solid glass spheres, hollow glass spheres, metal beads, metal spheres, ceramic spheres, $CaCO_3$ or combinations thereof, said material having a mean particle size in the range of from 0.1–10 μm, present at <20 weight %, based on the total weight of the core layer;

iii) a hydrocarbon wax having a melting point in the range of from 52–88° C., and a molecular weight in the range of 300–800;

iv) a hydrocarbon resin, said resin being one of petroleum resin, terpene resin, styrene resin, cyclopentadiene resin, saturated alicyclic resin, or combinations thereof, said resin has a number average molecular weight <5000, said resin has a softening point in the range of from 60°–180° C., said resin present in said core layer at <15 weight percent; or v) combinations thereof.

12. The film of claim 11, wherein said film is biaxially oriented, wherein said biaxial orientation is an orientation in the machine direction (MD) of from 400–900% of the original size, and the orientation in the TD is from 600%–1000% of the original size, wherein said film has a COF, as determined by ASTM D 1894, <2.

13. The film of claim 12, wherein an outermost surface of said second skin layer is treated with one of flame, plasma, corona, or polarized flame, wherein wherein said film has a COF, as determined by ASTM D 1894, <1.5, determined untreat to untreat.

14. The film of claim 13, wherein said outermost surface that is treated is metallized with vacuum deposition of aluminum, wherein said film has a COF, as determined by ASTM D 1894, <1.25.

15. The film of claim 13, wherein said film is coated on said treated surface of said film, said coating selected from one of, polyvinylidene chloride (PVDC), polyvinyl alcohol (PVOH), or combinations thereof, wherein said coating is present on said one or more outermost surface in the range of 0.2–5 μm, wherein said film has a COF, as determined by ASTM D 1894, <1.25.

16. The film of claim 13, wherein said film is coated and metallized on said treated surface of said film, said coating selected from one of, polyvinylidene chloride (PVDC), polyvinyl alcohol (PVOH), or combinations thereof, wherein said coating is present on said one or more outermost surface in the range of 0.2–5 μm, and said metallization is by vacuum deposition of aluminum, wherein said film has a COF, as determined by ASTM D 1894, <0.7 and a hot slip determined at 135° C. <1.8, both determined untreat to untreat.

17. A film, comprising:
a) a core layer having a first surface and a second surface, the core layer being selected from one of isotactic polypropylene homopolymer (iPP), syndiotactic polypropylene, propylene copolymers having a propylene content greater than 90 wt. %, propylene terpolymers having a propylene content greater than 90 wt. %, and combinations thereof, the core layer being present in the total film at a thickness in the range of from about 5 μm to about 500 μm;
b) a first tie layer, contiguous to the first surface of the core layer, the first tie layer being one of iPP, RCP, propylene butene copolymer (PB), ethylene propylene butene terpolymer (EPB), HDPE, LLDPE, medium density polyethylene (MDPE), maleic anhydride grafted polypropylene, maleic anhydride grafted polyethylene, sPP, or combinations thereof, the first tie layer further including in the range of from about 0.05 to about 2.0 wt. % of an additive selected from one of amorphous silica, calcium carbonate, magnesium silicate, aluminum silicate, calcium phosphate, crosslinked polymethacrylate, polymethyl silsesquioxane, polycarbonate, polyamide, polyester, polytetrafluoroethylene powder or combinations thereof with the wt. % based on the total weight of die first tie layer, wherein the first tie layer has a thickness in the film in the range of from about 0.5 μm to about 10 μm, wherein the additive has a mean particle size in the range of from about 0.5 μm to about 20 μm, wherein the mean particle size is greater than 10% of the thickness of the first tie layer; and
c) a first skin layer contiguous to the first tie layer, such that the first tie layer is spaced between the core and the first skin layer, the first skin layer being a material selected from one of iPP, RCP, PB, EPB, HDPE, LLDPE, MDPE, ethylene vinyl alcohol (EVOH), EVA copolymer, low density polyethylene (LDPE), ethylene propylene block copolymer or combinations thereof, the skin layer being substantially free of the additive wherein the first skin layer has a thickness in the range of from 0.1–8 μm and wherein the film has a COF, as determined by ASTM D 1894, of less than 2, with the COF measured on the first skin layer to itself.

18. The film of claim 17, wherein the film further comprises a second skin layer contiguous to the second surface of the core layer, the second skin layer being a material selected from one of iPP, RCP, PB, EPB, HDPE, LLDPE, LDPE, EVOH, EVA, MDPE, ethylene propylene block copolymer, and combinations thereof, the second skin layer being substantially free of the additive, wherein the second skin layer has a thickness in the range of from about 0.1 μm to about 8 μm, wherein the second and the first skin layers may be the same composition or different, and wherein the first and the second skin layers may be the same or different thickness; wherein the additive in the tie layer has a mean particle size greater than 20% of the thickness of the tie layer, and wherein the film has a COF, as determined by ASTM D 1894, of less than 1.5, wherein the COF is measured on the outermost surface of the skin layer.

19. The film of claim 18, wherein the film further comprises a second tie layer spaced between second surface of the core layer, and the second skin layer, the second tie layer being one of PP, RCP, PB, EPB, HDPE, LLDPE, MDPE, maleic anhydride grafted polypropylene, maleic anhydride grafted polyethylene, sPP, or combinations thereof, the second tie layer optionally including in the range of from about 0.05 to about 2.0 wt. % of an additive selected from one of amorphous silica, calcium carbonate, magnesium silicate, aluminum silicate, calcium phosphate, crosslinked polymethacrylate, polymethyl silsesquioxane, polycarbonate, polyamide, polyester, polytetrafluoroethylene powder or combinations thereof, the wt. % based on the total weight of the second tie layer, wherein the first and the second tie layers may be the same composition or different and wherein the first and the second tie layers may be the same thickness or different, wherein the core layer has a thickness in the range of from about 8.0 μm to about 40 μm, the skin layers have a thickness, each selected independently, in the range of from 0.5–5 μm, wherein the additive in the first and optionally in the second tie layers has a mean particle size greater than 30% of the thickness of the tie layers, wherein the film has a COF, as determined by ASTM D 1894 of less than 1.25.

20. The film of claim 19, wherein the core layer has a thickness in the range of from about 8.0 μm to about 30 μm, wherein the core layer is iPP, the tie layers have a thickness, each selected independently, from about 0.5 μm to about 3.0 μm, the skin layers have a thickness, each selected independently, of less than or equal to 1 μm, wherein the additive in the tie layers has a mean particle size more than 40% greater than the thickness of the tie layer, wherein the film has a COF, as determined by ASTM D 1894, of less than 1.0.

21. The film of claims 17, 18, 19, or 20, wherein the core layer further includes one of:
i) an opacifying agent selected from one of iron oxide, carbon black, aluminum, $TiO_2$, talc, or combinations thereof; the opacifying agent present in the core layer in the range of from about 1 to about 15 weight percent, based on the total weight of the core layer;

ii) a material selected from one of polybutene teraphthalate, nylon, solid glass spheres, hollow glass spheres, metal beads, metal spheres, ceramic spheres, $CaCO_3$, and combinations thereof, present in the core layer in the range of from about 1.0 to about 20 wt. %, the material having a mean particle size in the range of from about 0.1 µm to about 10 µm;

iii) a hydrocarbon wax having a melting point in the range of from 52° C. to 88° C., and a molecular weight in the range of 300 to 800;

iv) a hydrocarbon resin, the resin being one of petroleum resin, terpene resin, styrene resin, cyclopentadiene resin, saturated alicyclic resin, and combinations thereof, with a number average molecular weight greater than 5000, a softening point in the range of from 60°–180° C., present in the core layer at less than 15.0 wt. %; and v) combinations thereof.

22. The film of claim 21, wherein the film is biaxially oriented.

23. The film of claim 21, wherein the first and the second tie layer, if the second tie layer is present, including the additive selected from one of crosslinked polymethacrylate, polymethyl silsesquioxane, amorphous silica, and combinations thereof, the additive present in the first and the second tie layer in the range of from about 0.05 to about 2.0 wt %, included in each tie layer, if two are present, based on the total weight of the tie layer.

24. The film of claim 22, wherein the first and the second tie layer, if the second tie layer is present, included in each the additive selected from one of crosslinked polymethacrylate, polymethyl silsesquioxane, amorphous silica, and combinations thereof, the additive present in the first and the second tie layer in the range of from about 0.05 to about 2.0 wt. %, based on the total weight of the tie layer.

25. The film of claim 17, 18, 19, or 20, wherein the outermost surface of the second skin layer is treated by a method selected from one of flame, plasma, polarized flame or corona treatment, wherein the film has a COF, as determined by ASTM D 1894, on the outermost surface that is not treated of less than 0.9; wherein the film has a hot slip, at 135° C. of less than 2, wherein hot slip is determined on the outermost surface that is not treated.

26. The film of claim 24, wherein the film is treated on an outermost surface of the second skin layer by a method selected from one of flame, plasma, polarized flame or corona treatment, wherein the film has a COF, as determined by ASTM D 1894, on the outermost surface that is not treated less than 0.9; wherein the film has a hot slip, at 135° C. of less than 2.

27. The film of claim 25 wherein the treated surface is metallized.

28. The film of claim 27, wherein the film is metallized by vacuum deposition of aluminum.

29. The film of claim 25 wherein the treated surface is coated, the coating selected from one of acrylic, polyvinylidene chloride (PVDC), polyvinyl alcohol (PVOH), ethylene acrylic acid (EAA), ethylene methyl acrylate (EMA), or combinations thereof, wherein the coating on the one or more outermost surface in the range of about 0.2 µm to about 5.0 µm.

30. The film of claim 25 wherein the treated surface is coated, the coating selected from one of acrylic, polyvinylidene chloride (PVDC), polyvinyl alcohol (PVOH), ethylene acrylic acid (EAA), ethylene methyl acrylate (EMA), and combinations thereof, wherein the coating is present in the range of about 0.2 µm to about 5.0 µm and wherein the treated surface is metallized by vacuum deposition of aluminum.

31. The film of claim 24, wherein the film has a COF, as determined by ASTM D 1894 less than 0.8, wherein the film has a hot slip, at 135° C. of less than 1.9.

32. The film of claim 30, wherein the film has a COF, as determined by ASTM D 1894 less than 0.8; wherein the film has a hot slip, at 135° C. of less than 1.9.

33. The film of claim 24, wherein the film has a COF, as determined by ASTM D 1894 less than 0.7; and wherein the film has a hot slip, at 135° C. of less than 1.8.

34. The film of claim 30, wherein the film has a COF, as determined by ASTM D 1894 of less than 0.7; and wherein the film has a hot slip, at 135° C. of less than 1.8.

35. A film, comprising:

a) a core layer having a first surface and a second surface, the core layer being selected from one of high density polyethylene (HDPE), linear low density polyethylene (LLDPE), ethylene propylene random copolymer (RCP), isotactic polypropylene homopolymer (iPP), syndiotactic polypropylene (sPP) and combinations thereof, the core layer being present in the total film at a thickness in the range of from about 5 µm to about 500 µm;

b) a first tie layer, contiguous to the first surface of the core layer, the first tie layer being one of iPP, RCP, propylene butene copolymer (PB), ethylene propylene butene terpolymer (EPB), HDPE, LLDPE, medium density polyethylene (MDPE), maleic anhydride grafted polypropylene, maleic anhydride grafted polyethylene, sPP, or combinations thereof, the first tie layer further including in the range of from about 0.05 to about 2.0 wt. % of an additive selected from one of amorphous silica, calcium carbonate, magnesium silicate, aluminum silicate, calcium phosphate, crosslinked polymethacrylate, polymethyl silsesquioxane, polycarbonate, polyamide, polyester, polytetrafluoroethylene powder or combinations thereof with the wt. % based on the total weight of the first tie layer, wherein the first tie layer has a thickness in the film in the range of from about 0.5 µm to about 10 µm, wherein the additive has a mean particle size in the range of from about 0.5 µm to about 20 µm, wherein the mean particle size is greater than 10% of the thickness of the first tie layer;

c) a first skin layer contiguous to the first tie layer, such that the first tie layer is spaced between the core and the first skin layer, the first skin layer being a material selected from one of iPP, RCP, PB, EPB, HDPE, LLDPE, MDPE, ethylene vinyl alcohol (EVOH), EVA copolymer, low density polyethylene (LDPE), ethylene propylene block copolymer or combinations thereof, the skin layer being substantially free of the additive wherein the first skin layer has a thickness in the range of from 0.1–8 µm and wherein the film has a COF, as determined by ASTM D 1894, of less than 2, with the COF measured on the first skin layer to itself, and wherein the core layer further includes one of:

i) an opacifying agent selected from one of iron oxide, carbon black, aluminum, $TiO_2$, talc, or combinations thereof; the opacifying agent present in the core layer in the range of from 1–15 weight percent, based on the total weight of the core layer;

ii) a material selected from one of polybutene teraphthalate, nylon, solid glass spheres, hollow glass spheres, metal beads, metal spheres, ceramic spheres, $CaCO_3$ or combinations thereof, present in the core layer in the range of from 1–20 weight %, the material having a mean particle size in the range of from 0.1–10 μm;

iii) a hydrocarbon wax having a melting point in the range of from 52–88° C., and a molecular weight in the range of 300–800; or iv) a hydrocarbon resin, the resin being one of petroleum resin, terpene resin, styrene resin, cyclopentadiene resin, saturated alicyclic resin, or combinations thereof, the resin may have a number average molecular weight <5000, may have a softening point in the range of from 60°–180° C., the resin present in the core layer at <15 weight percent;

v) combinations thereof.

36. The film of claim 35, wherein the film further comprises a second skin layer contiguous to the second surface of the core layer, the second skin layer being a material selected from one of iPP, RCP, PB, EPB, HDPE, LLDPE, LDPE, EVOH, EVA, MDPE, ethylene propylene block copolymer, and combinations thereof, the second skin layer being substantially free of the additive, wherein the second skin layer has a thickness in the range of from about 0.1 μm to about 8 μm, wherein the second and the first skin layers may be the same composition or different, and wherein the first and the second skin layers may be the same or different thickness; wherein the additive in the tie layer has a mean particle size greater than 20% of the thickness of the tie layer, and wherein the film has a COF, as determined by ASTM D 1894, of less than 1.5, wherein the COF is measured on the outermost surface of the skin layer.

37. The film of claim 35, wherein the film further comprises a second tie layer spaced between second surface of the core layer, and the second skin layer, the second tie layer being one of PP, RCP, PB, EPB, HDPE, LLDPE, MDPE, maleic anhydride grafted polypropylene, maleic anhydride grafted polyethylene, sPP, or combinations thereof, the second tie layer optionally including in the range of from about 0.05 to about 2.0 wt. % of an additive selected from one of amorphous silica, calcium carbonate, magnesium silicate, aluminum silicate, calcium phosphate, crosslinked polymethacrylate, polymethyl silsesquioxane, polycarbonate, polyamide, polyester, polytetrafluoroethylene powder or combinations thereof, the wt. % based on the total weight of the second tie layer, wherein the first and the second tie layers may be the same composition or different and wherein the first and the second tie layers may be the same thickness or different, wherein the core layer has a thickness in the range of from about 8.0 μm to about 40 μm, the skin layers have a thickness, each selected independently, in the range of from 0.5–5 μm, wherein the additive in the first and optionally in the second tie layers has a mean particle size greater than 30% of the thickness of the tie layers, wherein the film has a COF, as determined by ASTM D 1894 of less than 1.25.

38. The film of claim 35, wherein the core layer has a thickness in the range of from about 8.0 μm to about 30 μm, wherein the core layer is iPP, the tie layers have a thickness, each selected independently, from about 0.5 μm to about 3.0 μm, the skin layers have a thickness, each selected independently, of less than or equal to 1 μm, wherein the additive in the tie layers has a mean particle size mote than 40% greater than the thickness of the tie layer, wherein the film has a COF, as determined by ASTM D 1894, of less than 1.0.

39. The film of claim 35, wherein the film is biaxially oriented.

40. The film of claim 38, wherein the first and the second tie layer, if the second tie layer is present, including the additive selected from one of crosslinked polymethacrylate, polymethyl silsesquioxane, amorphous silica, and combinations thereof, the additive present in the first and the second tie layer in the range of from about 0.05 to about 2.0 wt. %, included in each tie layer, if two are present, based on the total weight of the tie layer.

41. The film of claim 39, wherein the first and the second tie layer, if the second tie layer is present, included in each the additive selected from one of crosslinked polymethacrylate, polymethyl silsesquioxane, amorphous silica, and combinations thereof, the additive present in the first and the second tie layer in the range of from about 0.05 to about 2.0 wt. %, based on the total weight of the tic layer.

42. The film of claim 41, wherein the film has a COF, as determined by ASTM D 1894 less than 0.8, wherein the film has a her slip, at 135° C. of less than 1.9.

43. The film of claim 41, wherein the film has a COF, as determined by ASTM D 1894 less than 0.7; and wherein the film has a hot slip, at 135° C. of less than 1.8.

* * * * *